United States Patent
Hristov et al.

(10) Patent No.: US 11,648,722 B2
(45) Date of Patent: May 16, 2023

(54) PROCESS FOR REMOVING VOLATILE COMPONENTS FROM AN OLEFIN POLYMER AND ARTICLE OBTAINED

(71) Applicant: Borealis AG, Vienna (AT)

(72) Inventors: Velichko Hristov, Linz (AT); Mohammad Al-Haj Ali, Espoo (FI)

(73) Assignee: Borealis AG, Vienna (AT)

( * ) Notice: Subject to any disclaimer, the term of this patent is extended or adjusted under 35 U.S.C. 154(b) by 420 days.

(21) Appl. No.: 16/499,382

(22) PCT Filed: May 25, 2018

(86) PCT No.: PCT/EP2018/063781
§ 371 (c)(1),
(2) Date: Sep. 30, 2019

(87) PCT Pub. No.: WO2018/219805
PCT Pub. Date: Dec. 6, 2018

(65) Prior Publication Data
US 2021/0095058 A1    Apr. 1, 2021

(30) Foreign Application Priority Data
May 29, 2017 (EP) .................................... 17173186

(51) Int. Cl.
| | |
|---|---|
| *B29C 48/76* | (2019.01) |
| *B29C 48/405* | (2019.01) |
| *B29C 48/41* | (2019.01) |
| *B29C 48/92* | (2019.01) |
| *B29C 48/80* | (2019.01) |
| *B29B 7/84* | (2006.01) |
| *C08F 6/28* | (2006.01) |
| *C08F 210/16* | (2006.01) |
| *B29C 48/43* | (2019.01) |
| *B29C 48/04* | (2019.01) |
| *B29C 48/05* | (2019.01) |

(Continued)

(52) U.S. Cl.
CPC ............ *B29C 48/767* (2019.02); *B29B 7/845* (2013.01); *B29C 48/405* (2019.02); *B29C 48/41* (2019.02); *B29C 48/762* (2019.02); *B29C 48/802* (2019.02); *B29C 48/92* (2019.02); *C08F 6/28* (2013.01); *C08F 210/16* (2013.01); *B29B 9/065* (2013.01); *B29C 48/0022* (2019.02); *B29C 48/04* (2019.02); *B29C 48/05* (2019.02); *B29C 48/345* (2019.02); *B29C 48/43* (2019.02); *B29C 48/55* (2019.02); *B29C 48/625* (2019.02); *B29C 2948/92485* (2019.02); *B29K 2023/08* (2013.01)

(58) Field of Classification Search
CPC .... C08F 6/001; C08F 6/26; C08F 6/28; C08F 6/06; C08F 6/10; C08F 210/16; B29B 7/84; B29B 7/845; B29B 7/847; B29B 9/065; B29C 48/145; B29C 48/76; B29C 48/762; B29C 48/763; B29C 48/765; B29C 48/766; B29C 48/767; B29C 48/405; B29C 48/41; B29C 48/802; B29C 48/92; B29C 48/0022; B29C 48/04; B29C 48/05; B29C 48/345; B29C 48/43; B29C 48/55; B29C 48/625; B29C 2948/92485; B29C 48/40; B29K 2023/08
See application file for complete search history.

(56) References Cited

U.S. PATENT DOCUMENTS 4,686,279 A * 8/1987 Nagtzaam ................. C08F 6/12
528/501
5,062,713 A * 11/1991 Farquharson .......... G01N 21/85
356/402

(Continued)

FOREIGN PATENT DOCUMENTS

| EP | 2000283 A2 | 12/2008 |
|---|---|---|
| WO | WO 1991/016189 A1 | 10/1991 |
| WO | WO 2016/124617 A1 | 8/2016 |

OTHER PUBLICATIONS

Butler, Thomas; The Influence of Extruder Residence Time Distribution on Polymer Degradation; Jul. 1990; Journal of Plastic Film & Sheeting, vol. 6, pp. 247-259 (Year: 1990).*

(Continued)

*Primary Examiner* — Jeffrey M Wollschlager
(74) *Attorney, Agent, or Firm* — Lippes Mathias LLP

(57) ABSTRACT

The invention relates to a process for removal of volatile components from an olefin polymer, the process carried out in an extruder comprising at least one vacuum degassing zone, said process comprising the steps of: (a) introducing a stream of an olefin polymer into the extruder; (b) extruding the olefin polymer in the extruder at a temperature which is higher than the melting temperature of the olefin polymer but lower than the decomposition temperature of the olefin polymer, thereby producing an olefin polymer melt having reduced amount of volatile components, wherein the process in the extruder has a residence time distribution broadness (σ2) in the range of 800 to 4000 as define by equation (1) wherein: σ2 is the residence time distribution broadness, T is the mean residence time, t is the interval of residence time a fluid element of the olefin polymer spends in the extruder, E(t) is the residence time distribution function, and wherein the process optionally comprises a step (c) where the melt of the olefin polymer is passed through a die zone to a pelletizer for pelletizing the obtained olefin polymer.

$$\sigma^2 = \int_0^\infty (t-\tau)^2 E(t) dt \qquad \text{equation (1)}$$

8 Claims, No Drawings

(51) Int. Cl.
    *B29C 48/00*     (2019.01)
    *B29C 48/345*     (2019.01)
    *B29C 48/55*     (2019.01)
    *B29C 48/625*     (2019.01)
    *B29B 9/06*     (2006.01)
    *B29K 23/00*     (2006.01)

(56) References Cited

U.S. PATENT DOCUMENTS

2015/0158960 A1*   6/2015   Dussillols ................ B01J 19/18
    422/135
2017/0361543 A1*   12/2017   Bergman ................ B29C 48/05

OTHER PUBLICATIONS

Lepschi, Alexander; Determining the Residence Time Distribution of Various Screw Elements in a Co-Rotating Twin-Screw Extruder by Means of Fluorescence Spectroscopy; AIP Conference Proceedings 1664, 020005 (2015) (Year: 2015).*
International Search Report for PCT/EP2018/063781, dated Sep. 4, 2018.

* cited by examiner

PROCESS FOR REMOVING VOLATILE COMPONENTS FROM AN OLEFIN POLYMER AND ARTICLE OBTAINED This is a 371 of PCT/EP2018/063781, filed May 25, 2018, which claims priority to European Patent Application Serial No. 17173186.2, filed May 29, 2017, the contents of which are incorporated herein in their entirety.

The present invention relates to a process for removal of volatile components from an olefin polymer, the process carried out in an extruder. It also relates to an olefin polymer produced by said process. The invention further relates to an article comprising the olefin polymer produced by the process and to the use of said olefin polymer for producing an article.

Volatile components are entrained or dissolved in olefin polymers. These volatile components are typically purged from the olefin polymers using a flash separator, a purge column with an inert gas (e.g., nitrogen) or a steam dryer with water steam. Other process for removing volatile components from olefin polymer materials is carried out in an extruder comprising vacuum degassing zones where vacuum pressure is applied. Examples of this kind of process are found in the prior art, e.g. Co-rotating twin screw extruders, K. Kohlgrüber, pages 181-201, 2008.

However, the known volatile components reduction methods still have shortfalls for specific purposes. For example in low density and low melt flow rate olefin polymers containing heavy monomers like for example hexene or 1-octene (e.g., low density $C_2C_6$ or $C_2C_8$ plastomers and elastomers). These olefin polymers typically present an amount of volatile components such as above 400 ppm as measured according to VDA277.

Various applications of low density olefin polymers demand extremely low volatiles components concentration such as below 100 ppm (VOC, VDA277) in the case of plastomers and elastomers a concentration of volatile components below 65 ppm is typically required.

This is generally a problem since hexene and 1-octene are more difficult to remove compared to lighter comonomers like for example butene, resulting in demanding workup.

Therefore there still exists a need for a process for removal of volatile components from an olefin polymer, thus being suitable for removing volatile organic compounds like for example 1-octene and hexene.

INVENTION

The above mentioned disadvantages have now been overcome by providing a process for removal of volatile components from an olefin polymer, the process carried out in an extruder comprising at least one vacuum degassing zone, said process comprising the steps of:
(a) introducing a stream of an olefin polymer into the extruder;
(b) extruding the olefin polymer in the extruder at a temperature which is higher than the melting temperature of the olefin polymer but lower than the decomposition temperature of the olefin polymer, thereby producing an olefin polymer melt having reduced amount of volatile components,
wherein the process in the extruder has a residence time distribution broadness ($\sigma^2$) in the range of 800 to 4000 as define by equation 1

$$\sigma^2 = \int_0^\infty (t-\tau)^2 E(t)dt \qquad \text{equation (1)}$$

wherein:
$\sigma^2$ is the residence time distribution broadness,
$\tau$ is the mean residence time,
t is the interval of residence time a fluid element of the olefin polymer spends in the extruder,
E(t) is the residence time distribution function,
and wherein the process optionally comprises a step (c) where the melt of the olefin polymer is passed through a die zone to a pelletizer for pelletizing the obtained olefin polymer.

It has been surprisingly found that broadening of the residence time distribution in the extruder is a key for achieving effective removal of volatile components in the olefin polymer. i.e., large residence time distribution broadness ($\sigma^2$) is essential for effective reduction of volatile components in the olefin polymer.

DESCRIPTION OF THE INVENTION

The present invention provides a process for removal of volatile components from an olefin polymer, the process carried out in an extruder comprising at least one vacuum degassing zone, said process comprising the steps of:
(a) introducing a stream of an olefin polymer into the extruder;
(b) extruding the olefin polymer in the extruder at a temperature which is higher than the melting temperature of the olefin polymer but lower than the decomposition temperature of the olefin polymer, thereby producing an olefin polymer melt having reduced amount of volatile components,
wherein the process in the extruder has a residence time distribution broadness ($\sigma^2$) in the range of 800 to 4000 as define by equation 1

$$\sigma^2 = \int_0^\infty (t-\tau)^2 E(t)dt \qquad \text{equation (1)}$$

wherein:
$\sigma^2$ is the residence time distribution broadness,
$\tau$ is the mean residence time,
t is the interval of residence time a fluid element of the olefin polymer spends in the extruder,
E(t) is the residence time distribution function,
and wherein the process optionally comprises a step (c) where the melt of the olefin polymer is passed through a die zone to a pelletizer for pelletizing the obtained olefin polymer.

Olefin Polymer

The olefin polymer which is used in the process according to the invention may be any homopolymer of propylene, homopolymer of ethylene, copolymer of propylene with one or more comonomers selected from ethylene and alpha-olefins having from 4 to 10 carbon atoms, copolymer of ethylene with one or more comonomers selected from alpha-olefins having from 3 to 10 carbon atoms and mixtures thereof.

Specific type of the above mentioned copolymers are plastomers and elastomers. Plastomer and elastomer such as used herein is an olefin polymer that combines properties of an elastomer and a plastic, i.e. it has rubber-like properties and the processability of plastic. An example of plastomer and elastomer is a copolymer of ethylene and 1-octene, like for example the one sold under the brand Queo™ by Borealis. Other examples of plastomers and elastomers are those sold under the name of Engage™, Affinity™, Versify™, Infuse™, Exact™, Vistamaxx™, Tafmer™, Fortify™ and Lucene™.

The olefin polymer which is used in the process according to the invention generally has an $MFR_2$ of from 0.1 to 100 g/10 min, preferably of from 0.5 to 90 g/10 min, more preferably of from 0.5 to 80 g/10 min. The melt flow rate $MFR_2$ is measured according to ISO 1133 under a load of 2.16 kg and at a temperature of 190° C. for ethylene based polymers. The melt flow rate $MFR_2$ is measured according to ISO 1133 under a load of 2.16 kg and at a temperature of 230° C. for propylene based polymers.

When the olefin polymer which is used in the process according to the invention is a plastomer or an elastomer, it generally has an $MFR_2$ of from 0.1 to 100 g/10 min, preferably of from 0.5 to 90 g/10 min, more preferably of from 0.5 to 80 g/10 min. The melt flow rate $MFR_2$ is measured according to ISO 1133 under a load of 2.16 kg and at a temperature of 190° C. for ethylene based plastomers and elastomers. The melt flow rate $MFR_2$ is measured according to ISO 1133 under a load of 2.16 kg and at a temperature of 230° C. for propylene based plastomers and elastomers.

When the olefin polymer which is used in the process according to the invention is a plastomer or an elastomer, it generally has a mechanical hardness Shore A value of above 50, preferably of above 55 as measured according to ISO 868.

When the olefin polymer which is used in the process according to the invention is a plastomer or an elastomer, it generally has a mechanical hardness Shore D value of below 45, preferably of below 43 as measured according to ISO 868.

When the olefin polymer which is used in the process according to the invention is a plastomer or an elastomer, it generally has a density in the range of from 855 to 910 $kg/m^3$, preferably of from 860 to 905 $kg/m^3$.

The olefin polymer may be in the form of particles or pellets. The particle characteristics of the olefin polymer are not critical for the process according to the present invention.

The olefin polymer is generally produced in a polymerisation process, such as slurry polymerisation process, gas phase polymerisation process or solution polymerisation process where at least one olefin is polymerised in the presence of an olefin polymerisation catalyst. Generally, the olefin polymer is recovered from the polymerisation process and it is subjected to pressure reduction and purging steps to remove residual hydrocarbons from the olefin polymer before being introduced into the extruder of the process according to the present invention.

Extruder of the Process According to the Invention

The process for removal of volatile components from an olefin polymer according to the invention is carried out in an extruder. The extruder may be any extruder known in the art. The extruder may thus be a single screw extruder; a twin screw extruder, such as a co-rotating twin screw extruder or a counter-rotating twin screw extruder; or a multi-screw extruder, such as a ring extruder. Preferably the extruder is a single screw extruder or a twin screw extruder. Especially preferred extruder is a co-rotating twin screw extruder. These extruders are well known in the art and are supplied, for instance, by Coperion, Japan Steel Works, Krauss Maffei Berstorff or Leisteritz.

The extruder typically comprises a feed zone, a melting zone, a mixing zone and optionally a die zone. The extruder further comprises at least one vacuum degassing zone and optionally at least one stripping zone.

The extruder typically has a length over diameter ratio, L/D, of up to 60:1, preferably of up to 40:1. As it is well known in the art the co-rotating twin screw extruders usually have a greater L/D than the counter-rotating twin screw extruders.

The extruder may also have one or more feed ports for feeding further components, such as for example additives, into the extruder. The location of such additional feed ports depends on the type of material added through the port.

The Process

Feed Zone

According to step (a) of the process according to the present invention a stream of an olefin polymer is introduced into the extruder through a feed zone.

The feed zone directs the olefin polymer into the melting zone.

Melting Zone

The olefin polymer passes from the feed zone to a melting zone. In the melting zone the olefin polymer melts. The solid olefin polymer particles are conveyed by drag caused by a rotating screw. The temperature then increases along the length of the screw through dissipation of frictional heat and increases to a level higher than the melting temperature of the olefin polymer but lower than the decomposition temperature of the olefin polymer. Thereby the solid olefin polymer particles start to melt.

It is preferred that the screw in the melting zone is designed so that the screw channel in the melting zone is completely filled. Thereby the solid particles form a compact bed in the melting zone. This happens when there is sufficient pressure generation in the screw channel and the screw channel is fully filled. Typically the screw in the melting zone comprises conveying elements without substantial backwards flow.

Mixing Zone

After the melting zone the olefin polymer melt passes to a mixing zone. The screw in the mixing zone typically comprises one or more mixing sections which comprise screw elements providing a certain degree of backward flow. In the mixing zone the olefin polymer melt is mixed for achieving a homogeneous mixture.

Vacuum Degassing Zone

The extruder further comprises at least one vacuum degassing zone for removing volatile components from the olefin polymer melt. Said volatile components may include volatile organic compounds such as for example hydrocarbons, residual monomers, oligomers, additives, plasticizers and/or degradation products. The at least one vacuum degassing zone is generally placed downstream along the extruder. Suitably the at least one vacuum degassing zone can be located within the downstream end of the melting zone or within the mixing zone. It is possible to use more than one vacuum degassing zones. Such an arrangement is advantageous if there is large amount of gaseous material in the extruder.

Especially if there are multiple vacuum degassing zones it is sometimes advantageous to have the most upstream vacuum degassing zone after the melting zone and the subsequent vacuum degassing zones in the mixing zone and/or after the mixing zone.

In the vacuum degassing zone, a vacuum pressure is applied. The vacuum pressure in the vacuum degassing zone is generally in the range of from 50 to 600 mbar, preferably in the range of from 100 to 500 mbar, more preferably in the range of from 150 to 350 mbar.

Stripping Zone

The extruder may have at least one stripping zone where a stripping agent, such as water, steam or nitrogen, is suitably introduced to the extruder to assist in removing the volatile components from the olefin polymer melt. In the process according to the present invention, water is the preferred stripping agent.

The stripping agent, when used, is generally introduced upstream of the at least one vacuum degassing zone or when there are multiple vacuum degassing zones, upstream of the most downstream vacuum degassing zone.

The flow of stripping agent introduced in the extruder is generally of from 0.5 to 1.5%, preferably of from 0.5 to 1.0% relative to the total throughput of the olefin polymer in the extruder.

The advantage of using a stripping zone in the process according to the present invention is that the stripping agent introduced to the extruder reduces the partial pressure of the olefin polymer melt and volatile components mixture enhancing the removal of the volatile components in the vacuum degassing zone.

The process according to the invention optionally comprises a step (c) where the melt of the olefin polymer is passed through a die zone to a pelletizer for pelletizing the obtained olefin polymer.

Die Zone

The die zone typically comprises a die plate, which is generally a thick metal disk having multiple holes. The holes are parallel to the screw axis. When the olefin polymer melt is passed through the die it is generally cooled down and pelletized.

Pelletizer

The pelletizer is generally a strand pelletizer or an underwater pelletizer.

In the process according to the invention the olefin polymer is extruded at a temperature which is higher than the melting temperature of the olefin polymer but lower than the decomposition temperature of the olefin polymer. Suitably, the olefin polymer is extruded at a temperature at least 30° C. higher than the melting temperature of the olefin polymer, preferably the olefin polymer is extruded at a temperature at least 40° C. higher than the melting temperature of the olefin polymer, more preferably the olefin polymer is extruded at a temperature at least 50° C. higher than the melting temperature of the olefin polymer, but lower than the decomposition temperature of the olefin polymer.

In the process according to the invention, the screw speed of the extruder is typically in the range of 180 to 450 rpm, preferably in the range of 200 to 400 rpm.

In the process according to the invention the mean residence time (i) in the extruder is typically in the range of 100 to 220 seconds, preferably in the range of 100 to 200 seconds.

The process according to the invention has, in the extruder, a residence time distribution broadness ($\sigma^2$) in the range of 800 to 4000 as defined by equation 1

$$\sigma^2 = \int_0^\infty (t-\tau)^2 E(t) dt \qquad \text{equation (1)}$$

wherein:

$\sigma^2$ is the residence time distribution broadness, $\tau$ is the mean residence time, t is the interval of residence time a fluid element of the olefin polymer spends in the extruder, $E(t)$ is the residence time distribution function, This residence time distribution broadness is calculated by using a software for extruders, like Ludovic® provided by Sciences Computers Consultants Inc.

Preferably the process according to the invention has, in the extruder, a residence time distribution broadness ($\sigma^2$) in the range of 850 to 3800, more preferably in the range of 900 to 3500.

Large residence time distribution broadness is essential for effective reduction of volatile organic compounds in the olefin polymer. Large residence time distribution broadness allows having a better mixing of the olefin polymer along the extruder and increases the surface area in the extruder by reorienting the full stream of olefin polymer in the extruder.

In the process according to the invention, further components such as additives may be introduced into the extruder. Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers).

Generally the total amount of additives introduced into the extruder during the process according to the present invention, is not more than 5.0 wt %, preferably not more than 1.0 wt %, more preferably not more than 0.8 wt %. The amount of additives is relative to the total amount of the stream of olefin polymer introduced into the extruder.

Generally the additives are introduced into the extruder in the feed zone.

The present invention also provides an olefin polymer produced by the process according to the invention.

The resulting olefin polymer produced by the process according to the invention generally has a volatile organic compound content (VOC), as measured according to VDA277, of less than 65 ppm, preferably of less than 60 ppm, more preferably of less than 50 ppm.

The present invention further provides an article comprising the olefin polymer according to the invention. Suitable articles comprising the olefin polymer according to the invention are for example moulded articles, like injection moulded or blow moulded articles, automotive articles, like for example bumpers and automotive interior parts.

Finally the present invention relates to the use of the olefin polymer according to the invention for producing an article.

EXAMPLES

The following definitions of terms and determination methods apply for the above general description of the invention as well as to the below examples unless otherwise defined.

I—Measuring Methods a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The melt flow rate $MFR_2$ is measured according to ISO 1133 under a load of 2.16 kg and at a temperature of 190° C. for ethylene based polymers, ethylene based plastomers and ethylene based elastomers. The melt flow rate $MFR_2$ is measured according to ISO 1133 under a load of 2.16 kg and at a temperature of 230° C. for propylene based polymers, propylene based plastomers and propylene based elastomers.

b) Volatile Organic Compounds (VOC) VDA277.

The total emission of the olefin polymer was determined by using head space extraction according to VDA 277:1995 using a gas chromatograph and a headspace method. The equipment was an Agilent gas chromatograph with a WCOT-capillary column (wax type) of 30 m length and 0.25 mm×1.0 micrometer inner diameter (1 µm film thickness). A flame ionization detector was used with hydrogen as a fuel gas. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and carrier gas flow rate of 1 ml/min. The emission potential was measured on the basis of the sum of all values provided by the emitted substances after gas chromatography analysis and flame ionization detection with acetone as the calibration standard. Sample introduction (pellets, about 2 g) was by headspace analysis (20 ml head space vial) after conditioning at 120° C. for 5 hours prior to the measurement. The unit is microgram carbon per gram of sample, respectively ppm.

c) Calculation of Residence Time Distribution Broadness ($\sigma^2$)

The residence time distribution broadness ($\sigma^2$) was calculated by using the software for extruders called Ludovic® provided by Sciences Computers Consultants Inc. The calculation was mainly done based on given throughput rate in the extruder (kg/h) and screw speed in the extruder (rpm). The computation is performed assuming a certain number of virtual local reactors having their own local distribution time distributed along the screw profile. The Ludovic® software calculates the values of t, τ and E(t)dt needed for the calculation of the residence time distribution broadness ($\sigma^2$) using the following equation 1:

$$\sigma^2 = \int_0^\infty (t-\tau)^2 E(t) dt \qquad \text{equation (1)}$$

wherein:
$\sigma^2$ is the residence time distribution broadness,
τ is the mean residence time,
t is the interval of residence time a fluid element of the olefin polymer spends in the extruder,
E(t) is the residence time distribution function d) Density The density is measured according to ISO 1183D and ISO1872-2 for sample preparation.

e) Mechanical Hardness Shore A and Shore D

The mechanical hardness Shore A and Shore D are measured according to ISO 868 on 80×10×4 type B specimens. The specimens are moulded according to EN ISO 1872-2 for ethylene based polymers and according to EN ISO 1873-2 for propylene based polymers. For propylene based plastomers, propylene based elastomers, ethylene based plastomers and ethylene based elastomers the injection moulded specimens type B 80×10×4 mm are prepared according to ISO 20753.

II—Inventive and Comparative Examples

The olefin polymer used in the below inventive and comparative examples is an ethylene-1-octene copolymer (P1), manufactured and distributed by Borealis under the name of Queo™ 6800LA. The ethylene-1-octene copolymer (P1) has an $MFR_2$ of 0.5 (ISO 1133/190° C./2.16 kg), density of 868 kg/m³, a mechanical hardness Shore A of 74, a mechanical hardness Shore D of 22 and a melting temperature of 47° C.

All the inventive and comparative examples were carried out in a co-rotating twin screw extruder type Coperion ZSK 18 having a screw diameter of 18 mm, and an L/D ratio of 40:1. The extruder comprised two vacuum degassing zones within the mixing zone of the extruder where a vacuum pressure of 300 mbar was continuously applied. For each of the inventive and comparative examples a stream of the ethylene-1-octene copolymer (P1) was introduced in the extruder and extruded at a temperature of 230° C. After extrusion, the resulting ethylene-1-octene copolymer melt was pelletized after solidification of the strands in a water bath in a strand pelletizer at a water temperature of 15° C.

The process was carried out at different residence time distribution broadness ($\sigma^2$) using the ethylene-1-octene copolymer (P1) as described above. The process conditions and the resulting volatile organic compound value (VDA277) for each of the inventive and comparative examples can be seen in Table 1.

TABLE 1

Inventive examples (IE) and comparative examples (CE)

| | IE1 | CE1 | IE2 | CE2 | IE1* | IE2* |
|---|---|---|---|---|---|---|
| Screw speed (rpm) | 200 | 200 | 400 | 400 | 200 | 400 |
| Mean residence time in the extruder (τ) | 186 | 91 | 103 | 65 | 186 | 103 |
| Throughput rate in the extruder (kg/h) | 1.7 | 4.5 | 3.0 | 5.0 | 1.7 | 3.0 |
| Residence time distribution broadness ($\sigma^2$) | 3215 | 555 | 1020 | 365 | 3215 | 1020 |
| VDA277 (ppm) | 30 | 76 | 58 | 84 | 15 | 23 |

*Inventive examples where the process further comprises one stripping zone where water, as stripping agent, is introduced to the extruder. The flow of water was of 1.0% relative to the total throughput of the olefin polymer in the extruder.

From Table 1 it can be observed in IE1 and IE2 that the process according to the invention having larger residence time distribution broadness ($\sigma^2$) leads to a larger reduction of volatile organic compounds (VOC, VDA277) in the resulting ethylene-1-octene copolymer.

From Table 1 it can be observed in IE1* and IE2* that the presence of a stripping zone, using water as stripping agent, in the process according to the invention further improves the reduction of volatile organic compounds (VOC, VDA277) in the resulting ethylene-1-octene copolymer.

The invention claimed is:

1. A process for removal of volatile components from an olefin polymer, the process carried out in an extruder comprising at least one vacuum degassing zone, said process comprising the steps of:
(a) introducing a stream of an olefin polymer containing an initial amount of volatile components into the extruder;
(b) extruding the olefin polymer in the extruder at a temperature which is higher than the melting temperature of the olefin polymer but lower than the decomposition temperature of the olefin polymer, thereby producing an olefin polymer melt having a reduced amount of the volatile components,
wherein the process in the extruder has a residence time distribution broadness ($\sigma^2$) in the range of 800 to 4000 as defined by equation (1)

$$\sigma^2 = \int_0^\infty (t-\tau)^2 E(t) dt \qquad \text{equation (1)}$$

wherein:
$\sigma^2$ is the residence time distribution broadness,
τ r is the mean residence time,
t is the interval of residence time a fluid element of the olefin polymer spends in the extruder,
E(t) is the residence time distribution function, wherein the process optionally comprises a step (c) where the melt of the olefin polymer is passed through a die zone to a pelletizer for pelletizing the obtained olefin polymer; and wherein the mean residence time ($\tau$) in the extruder is in the range of 100 to 220 seconds; and wherein the resulting olefin polymer has a volatile organic compound content (VOC), as measured according to VDA277, of less than 65 ppm.

2. The process according to claim 1 wherein the screw speed of the extruder is in the range of 180 to 450 rpm.

3. The process according to claim 1 wherein the olefin polymer is a homopolymer of propylene, homopolymer of ethylene, copolymer of propylene with one or more comonomers selected from ethylene and alpha olefins having from 4 to 10 carbon atoms, copolymer of ethylene with one or more comonomers selected from alpha olefins having from 3 to 10 carbon atoms or mixtures thereof.

4. The process according to claim 1, wherein the olefin polymer is a plastomer or a elastomer or mixtures thereof.

5. The process according to claim 4, wherein the plastomer or elastomer is a copolymer of ethylene and 1-octene or a copolymer of ethylene and hexene.

6. The process according to claim 1 wherein the extruder further comprises at least one stripping zone.

7. The process according to claim 1 wherein the extruder is a single-screw extruder or a twin-screw extruder.

8. The process according to claim 1 wherein the olefin polymer is extruded at a temperature at least 40° C. higher than the melting temperature of the olefin polymer but lower than the decomposition temperature of the olefin polymer.

* * * * *